United States Patent [19]

Schulz

[11] Patent Number: 4,913,328
[45] Date of Patent: Apr. 3, 1990

[54] ACTIVE TAPE TRACKING SYSTEM WITH CROWN GUIDE ROLLERS FOR MAGNETIC RECORDER/PLAYERS

[75] Inventor: Gordon R. Schulz, Villa Park, Calif.

[73] Assignee: Odetics, Inc., Anaheim, Calif.

[21] Appl. No.: 58,588

[22] Filed: Jun. 5, 1987

[51] Int. Cl.4 ............... B65H 23/038; B65H 23/32
[52] U.S. Cl. ............................ 226/21; 226/20; 226/45; 226/190
[58] Field of Search ............. 226/19, 20, 21, 22, 226/23, 3, 45, 196, 197, 18, 15, 190; 242/76, 57.1; 250/548, 557

[56] References Cited

U.S. PATENT DOCUMENTS

| | | |
|---|---|---|
| 3,090,534 | 5/1963 | Frommer et al. ............... 226/21 |
| 3,313,461 | 4/1967 | Andersen ....................... 226/21 X |
| 3,443,108 | 5/1969 | Burmeister ..................... 250/548 |
| 3,802,774 | 4/1974 | Eschler et al. ................ 250/560 X |
| 3,865,483 | 2/1975 | Wojcik ......................... 250/548 X |
| 4,021,031 | 5/1977 | Meihofer et al. ............... 226/20 |
| 4,054,251 | 10/1977 | Henderson et al. ............. 226/15 X |
| 4,084,683 | 4/1978 | Moss ........................... 226/196 X |
| 4,286,201 | 8/1981 | Roecks et al. ................. 250/548 X |
| 4,582,235 | 4/1986 | Schulz ......................... 226/20 |
| 4,669,883 | 6/1987 | Ina et al. ..................... 250/548 X |

Primary Examiner—Joseph J. Hail, III
Attorney, Agent, or Firm—Spensley Horn Jubas & Lubitz

[57] ABSTRACT

A magnetic tape tracking system for a magnetic recorder/player having a crown guide roller whose orientation can be controlled to effect lateral movement of the tape. This movement is utilized to correct for deviation of the tape from its desired tape path.

13 Claims, 7 Drawing Sheets

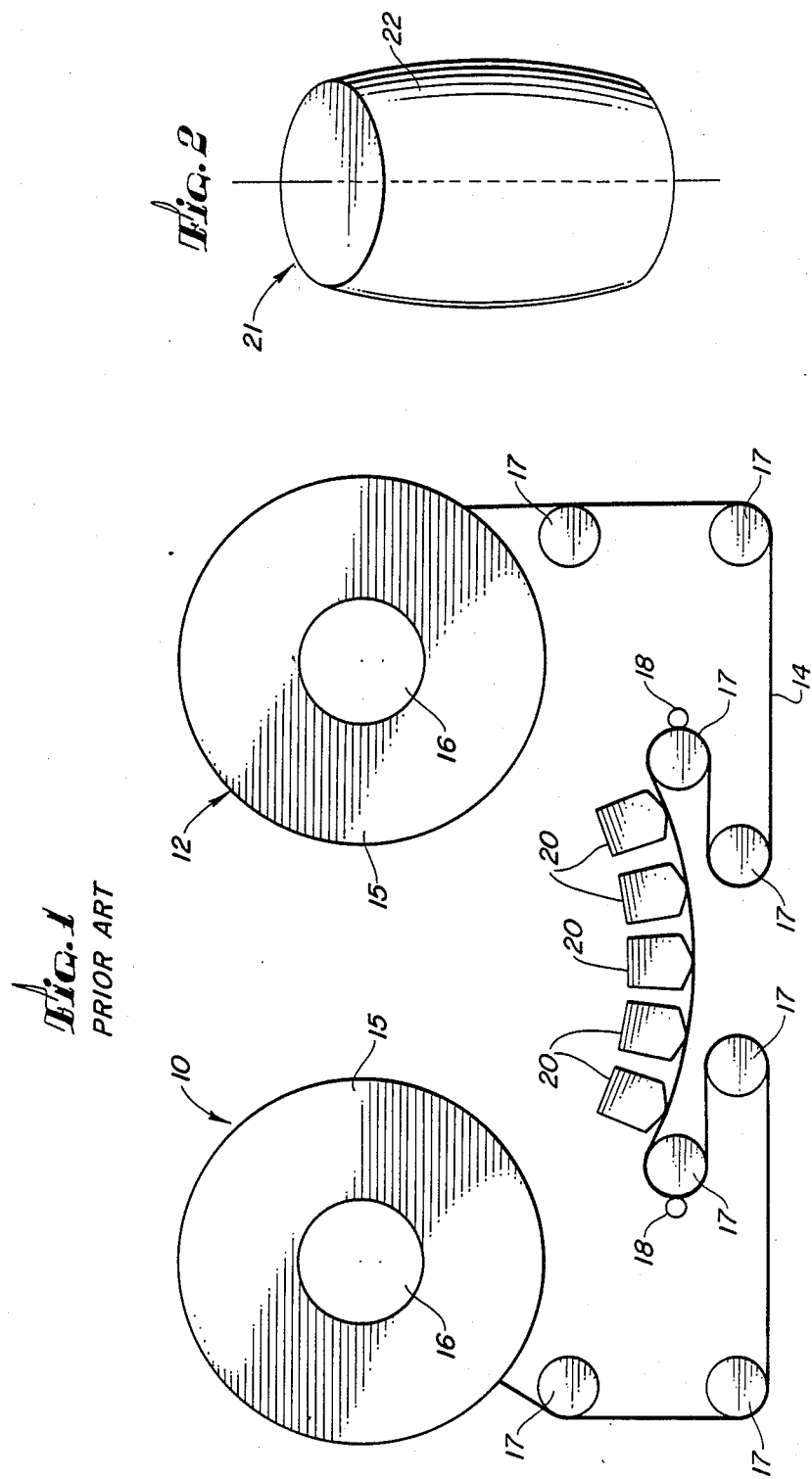

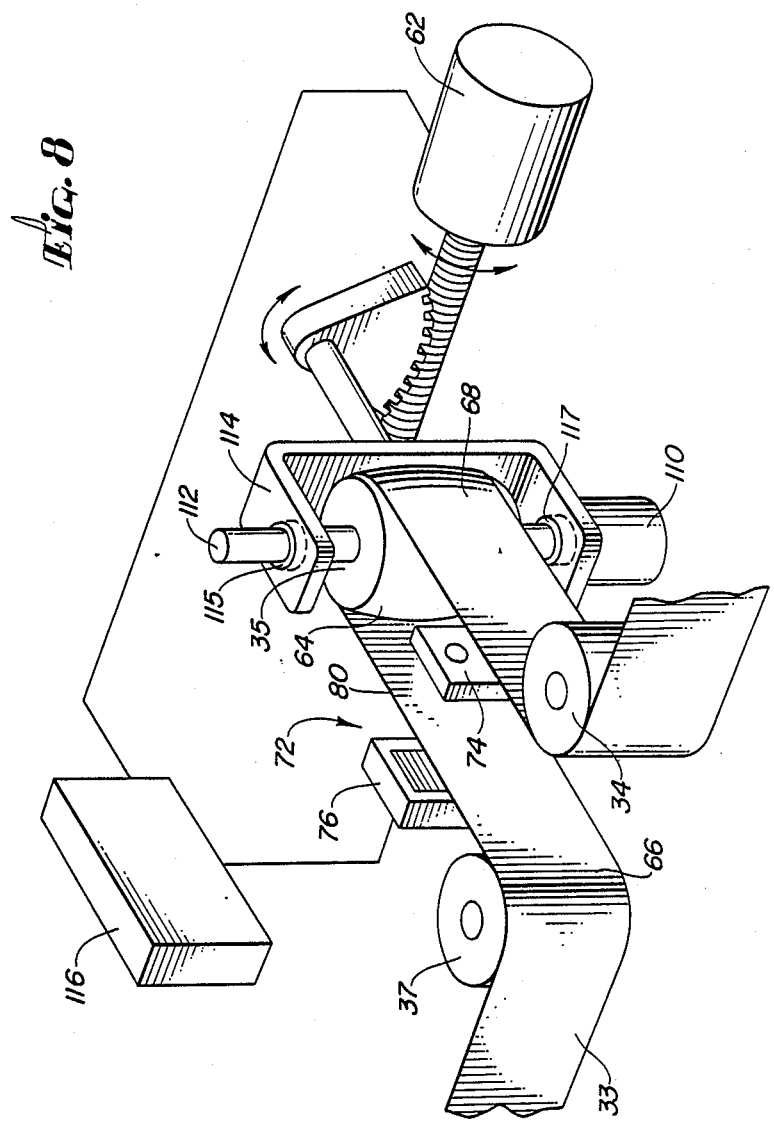

ACTIVE TAPE TRACKING SYSTEM WITH CROWN GUIDE ROLLERS FOR MAGNETIC RECORDER/PLAYERS

BACKGROUND OF THE INVENTION

1. Field of the Invention

The present invention relates to a tape tracking system and, more particularly, to an active tracking system which operates to adjust the lateral position of a magnetic tape in a magnetic recorder/player to maintain the tape along a predetermined path.

2. Description of the Prior Art

An arrangement of a typical tape recorder/player is shown in FIG. 1. The device includes a pair of tape reels 10 and 12, between which and wound thereon extends a length of magnetic tape 14. The reels each includes flanges 15 and a hub 16. A number of cylindrical guide rollers 17 and capstans 18, each rotatable about its axis, are provided between the reels to define a tape path along which the tape 14 is wrapped around the guide rollers 17 and capstans 18. The orientations of the axes of the guide rollers are fixed. Several magnetic read/write heads 20 are also provided along the tape path wherein the magnetic heads 20 are disposed against the tape 14 at different lateral position across the width of the tape 14. In operation, one of the reels, for example the reel 10, rotates, for example, in a clockwise direction thereby winding the tape onto the hub 16 of the reel 10 and pulling the tape along the tape path defined by the guide rollers 17 and the capstans 18 as the tape unwinds from the reel 12. The capstans 18 regulate the precise desired tape travel speed with respect to the heads. The direction of the tape travel may be reversed by rotating the reel 12 in a counterclockwise direction.

In magnetic recording or playback, information is written onto or read from the magnetic tape 14 along individual data tracks which are of a predetermined width and are spaced laterally across the width of the magnetic tape. Each data track interacts with one magnetic head 20. In order to store greater quantities of data on the magnetic tape without having to use a wider tape, it is necessary to increase the data track density. That is, the data is stored on a greater number of tracks across the width of the tape. Therefore it is necessary to reduce the spacing between adjacent data tracks and/or the width of each data track.

As the magnetic tape travels from one reel to another along the tape path, the tape may drift laterally from a nominal path. In so doing, it moves laterally across the surfaces of the cylindrical guide rollers 17. In the nominal position, each data track is centered about its associated magnetic head as the tape travels longitudinally along the tape path. As the track density is increased, it becomes increasingly important to maintain the data tracks in their nominal position in alignment with the magnetic heads. Because of the close track-to-track spacing and narrow track width, a slight deviation of the data tracks from their nominal positions can cause errors in reading or writing information.

It is also desirable to maintain the magnetic tape along a predetermined path for the purpose of winding the tape onto a reel. One problem encountered in winding the tape onto the reel is that the edges of the tape have a tendency to rub against the flanges of the reel thereby causing the edges to chafe which will reduce the useful life of the tape.

One guidance system in a magnetic recorder/player for maintaining a tape along its nominal path makes use of cylindrical guide rollers with edge flanges at their ends to forcibly constrain the tape along its predetermined path. A problem encountered in this system is that the edges of the tape deteriorate over time as a result of friction against the edge flanges, thus requiring tape replacement. While this does not necessarily present a problem where this system is applied in a ground station, it certainly presents a problem where such a system is designed for application in a space satellite where it must operate over many years without maintenance.

Another guidance system for maintaining a tape along a nominal path makes use of crown guide rollers in place of the cylindrical guide rollers 17 shown in FIG. 1. Referring to FIG. 2, a crown guide roller 21 has a circumferential surface 22 that is convex in the axial direction. As the tape which is wrapped around the crown guide roller is travelling longitudinally, due to the convex surface 22, the crown guide roller has a tendency to center the tape without the need to use end flanges at the ends of the roller. While the crown guide roller is capable of reducing some deviation of the tape from its nominal path, it is not suitable for application in cases where there is a high frequency perturbation of the tape from its nominal path and where there is a sudden large perturbation. Also, it is difficult to precisely fix the lateral position of the crown guide roller to correspond to the desired nominal tape position.

Another automatic tape tracking system is disclosed in U.S. Pat. No. 4,582,235, issued to Gordon R. Schulz, the inventor of the present invention. The system disclosed therein is a relatively complex system employing cylindrical guide rollers and optical means for monitoring the position of the tape. The guide rollers are adjustable in height and to change the direction of their axes. Adjustments in the height and axial orientation of the rollers are made in response to the monitored position in order to maintain the tape in a desired location. This system is very useful for wide tape, e.g., two inches. However, the system is relatively complex, large and requires a relatively large amount of power.

SUMMARY OF THE INVENTION

The present invention is directed to a tracking system for magnetic recorder/player for guiding and maintaining (tracking) a magnetic tape along a predetermined path, which is defined by guide rollers including a crown guide roller, by means of active control of the orientation of the axis of rotation of the crown guide roller in response to a drift in lateral position of the tape to cause the tape to move laterally towards the desired predetermined tape path. The system is much more precise than prior art crown roller systems and much less complex costly than the active system of U.S. Pat. No. 4,582,235.

The lateral position of the tape is monitored by sensors which are disposed along the path of the tape. If the tape is off track, a controller activates a drive motor in response to the determined position of the tape to tilt a frame on which the crown guide roller is mounted thereby to tilt the axis of the crown guide roller to effect a lateral movement of the tape. Thus a rough centering operation is provided by the crown roller itself and fine tracking achieved by tilting the crown roller.

To further facilitate the tracking of the magnetic tape along a predetermined path, the crown guide roller may be controlled to move along its axial direction to bring about lateral movement of the tape. Such axial motion is also controlled in response to the drift in the lateral position of the tape as determined by the sensors.

The tracking system not only is suitable for aligning the magnetic tape for read and write operations by a magnetic head but also is suitable for aligning the tape for winding onto a reel.

BRIEF DESCRIPTION OF THE DRAWINGS

FIG. 1 is a top plan view of a typical magnetic recorder/player transport arrangement;

FIG. 2 is a perspective view of a crown guide roller;

FIG. 8 is a further embodiment of the present invention.

DESCRIPTION OF THE PREFERRED EMBODIMENT

The following description is of the best presently contemplated mode of carrying out the invention. In the accompanying drawings, like numerals designate like parts in the several figures. This description is made for the purpose of illustrating the general principles of the invention and should not be taken in a limiting sense. The scope of the invention is best determined by reference to the accompanying claims.

Figure 3:
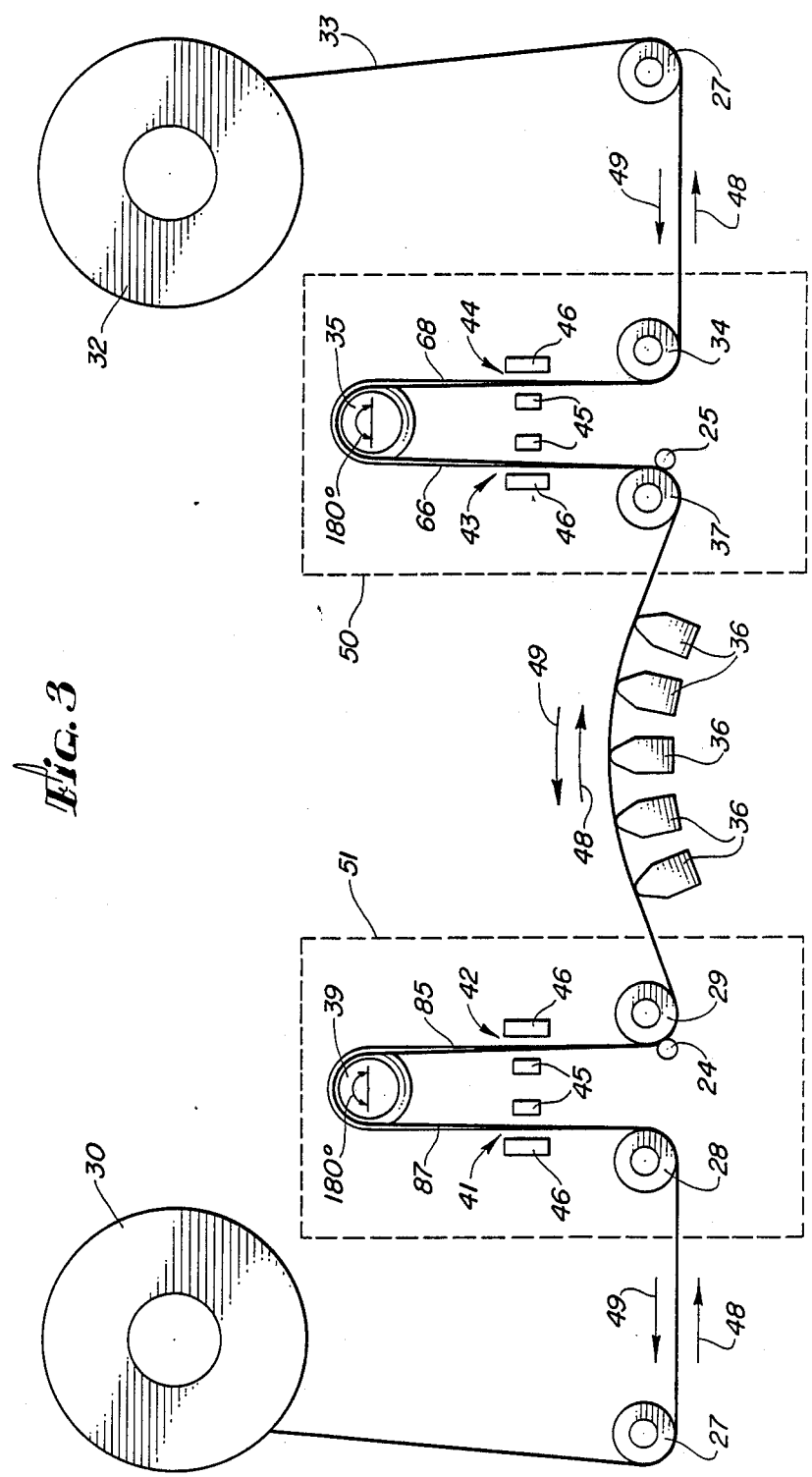
FIG. 3 is a top plan view of a magnetic recorder/player incorporating the tracking system of the present invention.

FIG. 3 shows an example of a magnetic recorder/player which incorporates the active tracking system of the present invention. The recorder/player includes a pair of tape reels 30 and 32, between which and wound thereon extends a length of magnetic tape 33. A number of guide rollers including cylindrical guide rollers 27, 28, 29, 34 and 37 and crown guide rollers 35 and 39 are disposed between the reels to define a path along which the tape 33 will travel. Each guide roller is mounted on a shaft and is freely rotatable about its axis. The orientations of the axes of the crown guide rollers 35 are changeable whereas the axes of the cylindrical guide rollers are fixed. The tape is wrapped around the guide rollers. Capstans 24 and 25 serve to drive the tape. A number of magnetic read/write heads 36 are provided along the tape path and pressed against the tape 33. Each magnetic head 36 is positioned at a different lateral location across the width of the tape. The magnetic tape 33 is caused to travel longitudinally as the reels 30 and 32 rotate. The travel of the magnetic tape is bidirectional, depending on the rotations of the reels 30 and 32. The reel which pulls the tape 33 as it rotates is the takeup reel and the other reel is the supply reel. The tape is wound onto the takeup reel as it unwinds from the supply reel. As the tape 33 passes over the magnetic heads, each magnetic head either reads or writes a track of data from or onto the tape, respectively.

The lateral position of the tape is monitored by optical sensor units 41 to 44. Each unit comprises, for example, a light source 45 and a light detector 46 located on opposite sides of the tape as shown in FIG. 3. When the tape is travelling in the direction of arrow 48, the sensor unit 42 monitors the lateral position of the portion 85 of the tape which will be passing over the magnetic heads 36 and the sensing unit 44 monitors the portion 68 of the tape which will be wound onto the reel 32. When the tape travel is reversed in the direction of arrow 49, the sensor unit 43 monitors the lateral position of the portion 66 of the tape which will be passing over the magnetic heads 36 and the sensing unit 41 monitors the lateral position of the portion 87 of the tape which will be wound onto the reel 30.

In the particular system shown in FIG. 3, two crown guide rollers 35 and 39 are provided, one located on either side of the magnetic heads 36 along the tape path, wherein each crown guide roller is located between a reel and the magnetic heads. Each crown guide roller 35 or 39 and its two adjacent cylindrical guide rollers 34 and 37 or 28 and 29, respectively, form a part of an active control module 50 or 51, respectively.

Figure 4:
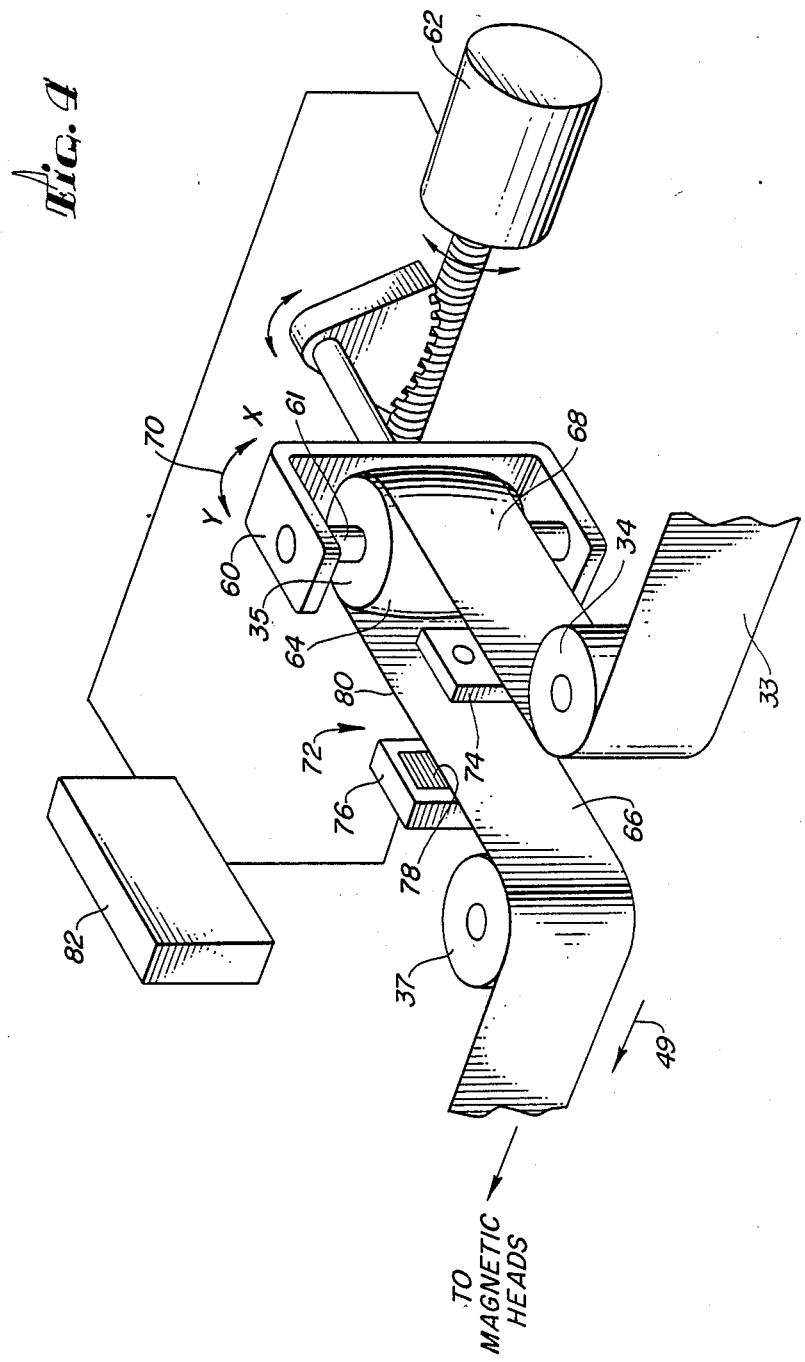
FIG. 4 is a perspective view of the present invention.

The structure of the active control modules 50 and 51 in FIG. 3 can best be described with reference also to FIG. 4 which shows the structure the control modules 50, a sensor unit and a control system. The crown guide roller 35 is mounted on bearings onto a shaft 61 about which the crown guide roller 35 can freely rotate. The shaft is in turn mounted to a frame 60 which is coupled to a limited-rotation motor 62 by means of a system of gears and pinions. The frame is rotatable about an axis which is perpendicular to the axis of the crown guide roller 35 and which is at the midsection of the crown guide roller 35.

A cylindrical guide roller 34 is provided along the tape path on one side of the crown guide roller 35 and another cylindrical guide roller 37 is provided on the other side so as to define a tape path wherein the tape 33 is wrapped around the crown guide roller with a 180° wrap angle, i.e. the tape contacts the circumferential surface 64 of the crown guide roller 35 through an arc angle of 180°, as is also indicated in FIG. 3. In this configuration, the portion 66 of the tape is parallel to the portion 68 of the tape. The frame is tiltable in a direction as shown by arrow 70 in the plane of the tape at the midpoint of the wrap angle.

The lateral position of the tape is monitored by a sensor unit 72 located between the cylindrical guide roller 37 and the crown guide roller 35 along portion 66 of the tape. It is noted that only one sensing unit is shown in FIG. 4 for clarity. Another sensing unit may be provided along the portion 68 of the tape between the crown guide roller 35 and the cylindrical guide roller 34 as is shown in FIG. 3. The sensor unit 72 includes a light source 74 and an optical sensor 76 on opposite sides of the tape. The optical sensor 76 is preferably a line scanner which includes pixels of light sensitive elements 78 arranged in a linear array. The light source 74 is directed at the edge 80 of the tape to cast an image of the tape edge 80 onto the optical sensor 76. The optical sensor 76 is made large enough to cover the predicted range of lateral movement of the tape edge. The tape edge 80 blocks part of the light from the optical sensor. Therefore, some of the elements 78 will receive light while others will be shaded by the tape. The optical sensor 76 provides an electrical output which is directly related to the position of the tape edge 80. This output is sent to a controller 82 which appropriately controls the rotation of the motor 62 to tilt the frame 60 thereby tilting the axis of the crown guide roller to effect a correction of the lateral position of the tape if it is necessary in response to the detected tape position.

Figure 5:
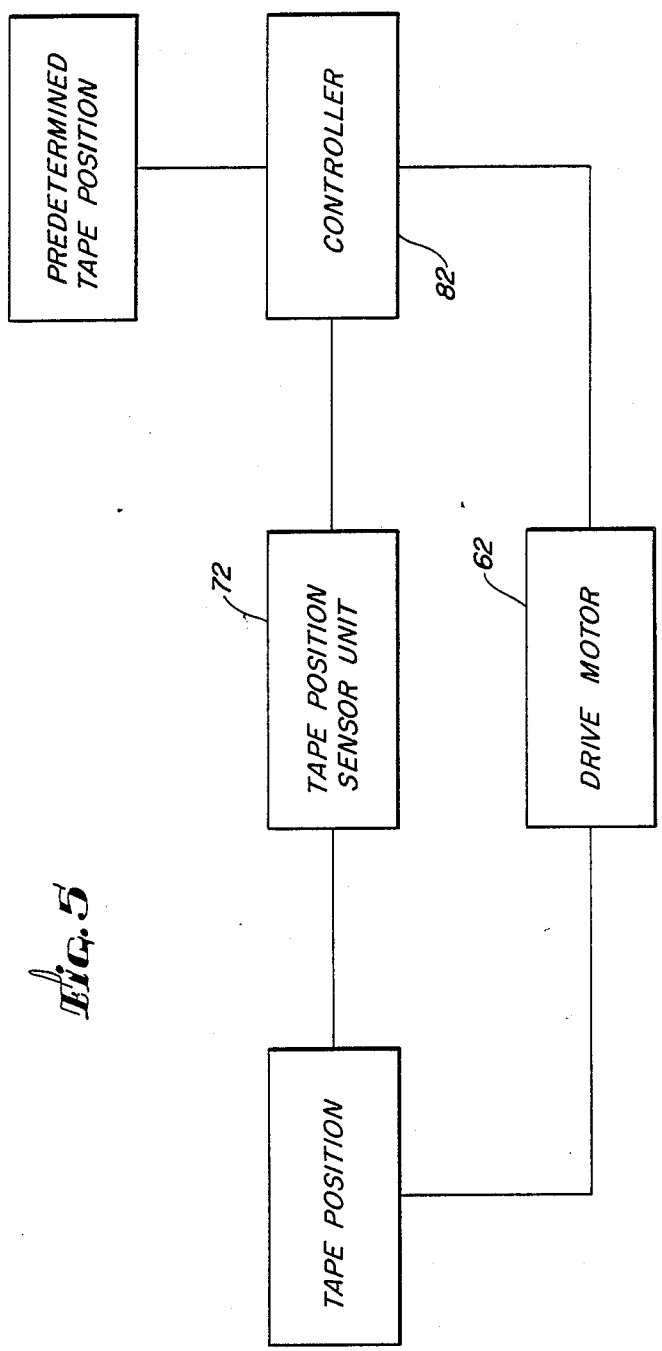
FIG. 5 is a block diagram of the present invention.

A functional block diagram of the active tracking system of the present invention is shown in FIG. 5. The tape position sensor unit 72 detects the position of the tape edge 80 and sends the positional information to the controller 82 which compares the detected tape position to the predetermined desired tape position. If this comparison indicates that the tape has drifted from its predetermined lateral position, the controller 82 sends a signal to the drive motor 62 to rotate the frame 60 so as to tilt the axis of the crown roller 35.

Referring back to FIG. 4, if the tape edge 80 of the portion 66 is determined to be below the desired position, the axis of the crown axis roller 35 is tilted in the direction X thereby raising the tape edge 80 of the portion 66. If the tape edge position is determined to be below the desired position, the axis of the crown guide roller 35 is rotated in the direction Y thereby lowering the tape edge 80 of the portion 66. The new position is again determined by the sensor unit 72 and if the tape is still off track, the controller will tilt the crown guide roller accordingly until the tape is at its predetermined position. In the case where the tape is travelling in the direction of arrow 49 towards the magnetic heads 36, this predetermined position corresponds to a desired tape position at the magnetic heads whereby the data tracks are in alignment with the magnetic heads 36. As the tape portion 66 travels around the cylindrical guide roller 37, the tape slides across the cylindrical guide roller 37 to conform to the new edge position brought about by the tilt adjustment of the crown guide roller 35. The tape portion 66 coming around the cylindrical guide roller 37 will be aligned with magnetic heads wherein the data tracks of the tape will be centered with respect to their associated magnetic heads.

Figure 6:
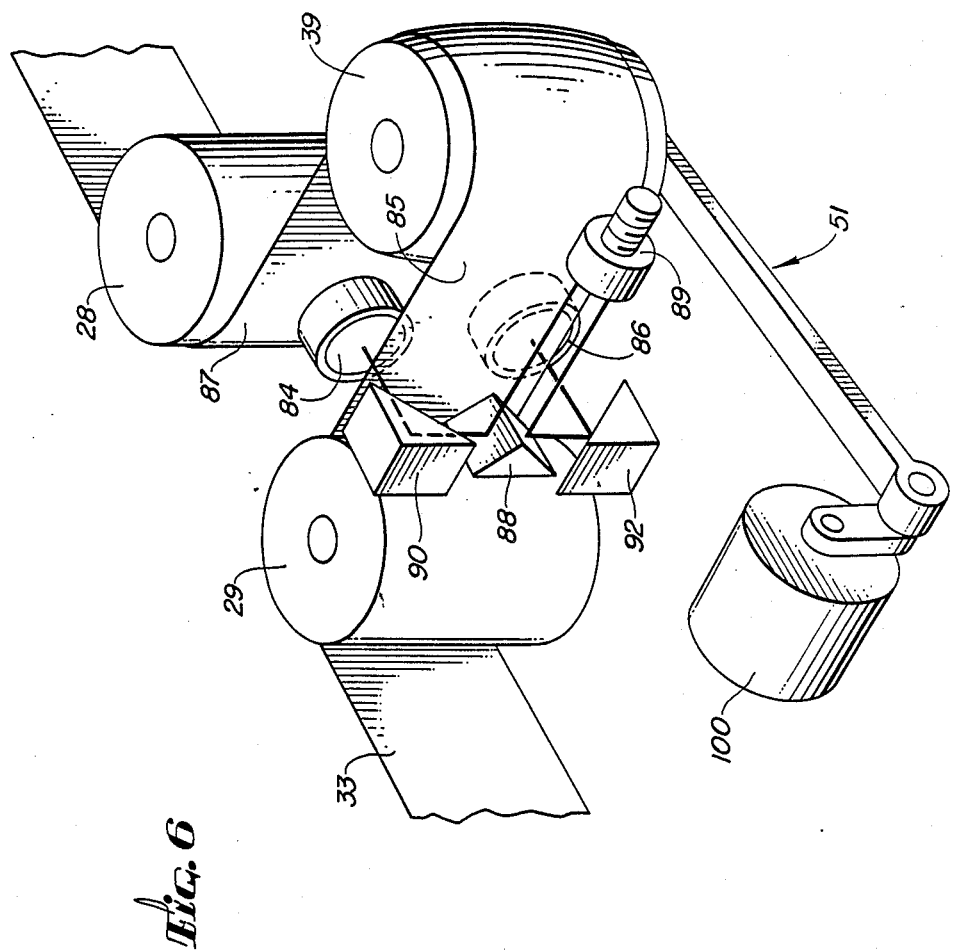
FIG. 6 is a perspective view of another embodiment of the present invention.

FIG. 6 shows an alternate embodiment of a tape position sensor unit. Instead of determining the position of the tape edge and comparing it to a desired predetermined tape position, the sensing system of this embodiment determines if the tape edge has drifted from a preset location. This embodiment will be described with reference to the active control module 51 shown in FIG. 3. In this embodiment, a light source 89 such as an infrared light emitting diode is positioned on one side of the portion 85 of the tape 33 between the crown guide roller 39 and the cylindrical guide roller 37 and two optical detectors 84 and 86 such as photodiodes are placed on the opposite side of the tape close to the edges. The light beam from the light source 89 is split by beam splitter 88, with half the light beam directed pass the top edge of the tape at the top photodiode 84 by means of a reflective surface 90, and the other half directed pass the bottom edge of the tape at the bottom photodiode 86 by means of reflective surface 92. Both beams pass adjacent to the edges of the tape such that any lateral movement in the tape will cause one of the beams to be partially blocked. Each photodiode produces an electrical current that is proportional to the amount of illumination it received. The photodiodes are arranged such that when the tape is at its nominal position, the photodiodes receive approximately the same amount of light passing adjacent to the tape edges, and when the tape has drifted laterally, one of the photodiodes will receive less light as the light beam which is directed at this photodiode is partially blocked by the tape. The outputs of the photodiodes are biased so that they are exactly the same when the tape is at its nominal position.

Figure 7:
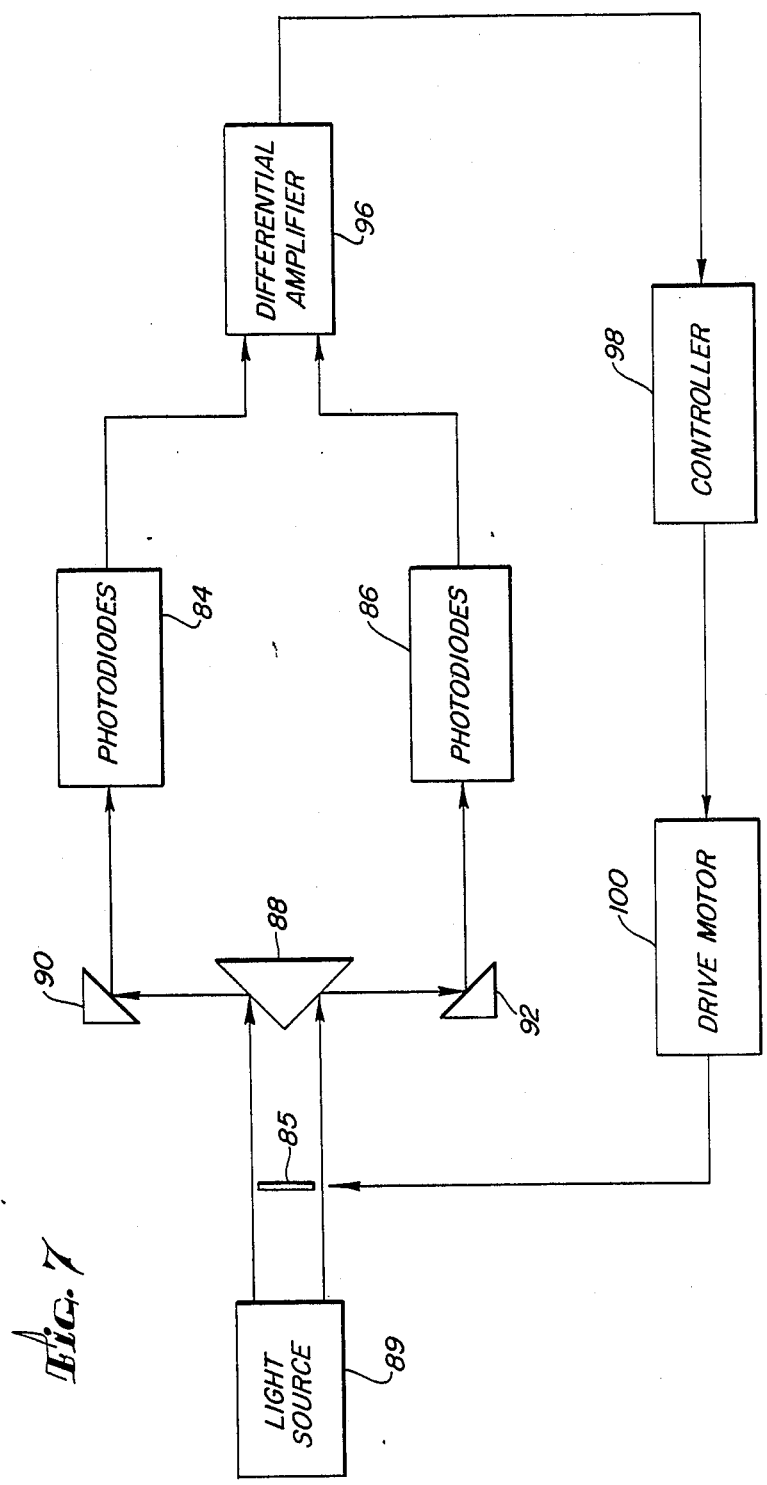
FIG. 7 is a block diagram of the embodiment of FIG. 6 of the present invention.

Referring to FIG. 7, the outputs from the photodiodes 84 and 86 are fed to a differential amplifier 96 which generates an output that is proportional to the difference between the current of the photodiodes 84 and 86. Thus, when the tape is at its nominal position, the output of the differential amplifier 96 is zero. If the tape has drifted laterally, one of the photodiodes which receives more light will produce a higher current output than the other whose light illumination has been partially blocked by the tape, thus the differential amplifier output is no longer zero. This output is directed to a controller 98 which determines the appropriate amount of rotation of the drive motor 100 to tilt the frame on which the crown guide roller 39 is mounted. Thereby, the tape position is corrected by the process described previously with respect to the embodiment of FIGS. 4 and 5.

In addition to the function of tracking tape position in reference to the magnetic heads for the purpose of read/write operation, the present system can be used to track the position of the tape that is being wound onto a takeup reel which has flanges. This will prevent the tape edges from rubbing against the flanges of the reel. It has been found that friction of the tape edges against the flanges will deform the tape and destroy the utility of the tape. An application of the active tracking system for tape winding is illustrated by the structure of the magnetic recorder/player shown in FIG. 3.

Referring back to FIG. 3, there are two crown guide rollers 35 and 39, one on each side of the magnetic heads along the tape path 33. The axes of the crown guide rollers are tiltable to effect active tracking of the magnetic tape. The tracking system as shown in FIG. 3 is bidirectional, i.e. it can perform tape tracking in either the forward or reverse tape direction. In a forward direction of the arrow 48, the crown guide roller system 51 will correct for the lateral position of the tape that is passing over the magnetic heads 36, while the other crown guide roller system 50 will correct for the lateral position of the tape that is entering the reel 32. When the tape direction is reversed in the direction of the arrow 49, the roles of the two tracking systems are also reversed, i.e. the crown guide roller system 50 now tracks the tape passing over the magnetic heads 36, while the crown guide roller system 51 tracks the tape entering the reel 30.

According to the present invention, an active control system on a crown guide roller provides for correction of the deviations in the nominal lateral position of the magnetic tape. These deviations comprise two components, a large amplitude low frequency component and a small amplitude high frequency component. The low frequency high amplitude component of the deviation in tape position is corrected by the crown guide roller acting alone. The high frequency small amplitude component of the variation in tape position is corrected by the active tilt adjustment of the crown guide roller.

The described active tracking of tape position can be further facilitated by providing for active control of the axial motion of the crown guide roller in addition to the tilt control described above. The axial movement of the crown guide roller will correct for large but sudden deviation in the tape position caused by a sudden large perturbation. Referring to FIG. 8, the axial motion of the crown guide roller 35 is provided by a second drive motor 110 acting on a shaft 112 of the crown guide roller. The output of the second drive motor 110 does not rotate but moves axially. In this case, the shaft is supported by a frame 114 by means of linear bearings 115 and 117. The crown guide roller is fixed to the shaft in the axial direction but is freely rotatable about the shaft 112. When a drift in the lateral position of the tape is detected by the sensing system 72 as described in the previous embodiment of FIGS. 4 and 5, a controller 116 activates the drive motor 62 to tilt the frame 114 as well as the drive motor 110 to move the crown roller in the axial direction.

To still further facilitate tape tracking, the cylindrical guide rollers in the systems described above may be replaced with crown guide rollers having fixed axes.

In summary, the present invention provides a system for a magnetic recorder/player for tracking a magnetic tape along a predetermined path by means of active control of a crown guide roller. The orientation of the axis of the crown guide roller can be controlled to effect a lateral movement of the tape to correct for deviation from the predetermined path as monitored by a sensor. The present system can be used to track the tape path across a set of magnetic heads, as well as to track the tape path as it winds onto a takeup reel which has flanges. The crown guide roller may be controlled to be moveable in its axial direction in response to sudden large deviation in the tape path.

It should be noted that the invention is not limited to tracking magnetic tapes in magnetic recorder/players. The present invention could be applicable to other types of tapes. While the present invention has been described with respect to the preferred embodiments in accordance therewith, it will be apparent to those skilled in the art that various modifications and improvements may be made without departing from the scope and spirit of the invention.

Accordingly, it is to be understood that the invention is not to be limited by the specific illustrative embodiments, but only by the scope of the appended claims.

I claim:

1. A tape position tracking system for guiding and maintaining lateral position of a tape which is travelling along a predetermined path between a supply reel and a takeup reel, comprising at least one guide roller module each module comprising:
   a plurality of guide rollers each rotatable on a shaft and at least one of which is a crown guide roller, the guide rollers forming a continuous tape path between the supply reel and the takeup reel wherein the tape is wrapped around the guide rollers,
   frame means for supporting the crown guide roller for pivotal movement;
   drive means coupled to the frame means for pivoting the crown guide roller;
   means for sensing the lateral position of the tape; and
   control means responsive to the sensing means for activating the drive means thereby to maintain the lateral position of the tape along the predetermined path.

2. A tape position tracking system according to claim 1, wherein each guide roller module includes one crown guide roller and two cylindrical surface guide rollers each disposed in the tape path and at each side of the crown guide roller.

3. A tape position tracking system according to claim 2, wherein the wrap angle of the tape around the crown guide roller is approximately 180°.

4. A tape position tracking system according to claim 3, wherein the frame means supports the crown guide roller for tilting in the plane of the tape at the midpoint of the wrap angle.

5. A tape position tracking system according to claim 1, wherein the sensing means is disposed along the tape path downstream of the crown guide roller in a direction of tape travel.

6. A tape position tracking system according to claim 1, wherein the sensing means is disposed along the tape path upstream of the crown guide roller in a direction of tape travel.

7. A tape position tracking system according to claim 1, wherein the sensing means includes a light source disposed adjacent a first side of the tape near an edge of the tape and a light detector responsive to light disposed adjacent a second side of the tape near the edge of the tape such that the light source directs light at the light detector and that the edge of the tape blocks part of the light from the light source to the light detector.

8. A tape position tracking system according to claim 7, wherein the light detector includes an array of light sensitive elements which produces an output signal which is indicative of the tape position in response to light illumination from the light source passing by the edge of the tape.

9. A tape position tracking system according to claim 1, wherein the sensing means includes a light source disposed on a first side of the tape and first and second light detectors responsive to light disposed on a second side of the tape and near first and second edges of the tape, respectively, such that the light source directs light at the light detectors and that one of the edges of the tape blocks part of the light from the light source to one of the light detectors as the tape moves laterally from the predetermined path.

10. A tape position tracking system according to claim 9, wherein the first and second light detectors each produces a signal of a magnitude proportional to the illumination from the light source passing by the first and second edges of the tape, respectively, and wherein the sensing means further includes means for producing an error signal determined from the difference in the magnitudes of the first and second light detector signals.

11. A tape position tracking system according to claim 10, wherein the magnitude of the signals from the first and second light detector are the same when the lateral position of the tape is along the predetermined path.

12. A tape position tracking system according to claim 1, further comprising:
   a second drive means attached to the frame means for moving the crown guide roller axially along the shaft; and
   a second control means responsive to the sensing means for activating the second drive means thereby to maintain the lateral position of the tape along the predetermined path.

13. A tape position tracking system for guiding and maintaining lateral position of a tape which is travelling along a predetermined path for winding the tape onto a takeup reel, comprising:
   a plurality of guide rollers each rotatable on a shaft and at least one of which is a crown guide roller, the guide rollers forming a continuous tape path leading to the takeup reel;
   frame means for supporting the crown guide roller for pivotal movement;
   drive means coupled to the frame means for pivoting the crown guide roller;
   means for sensing the lateral position of the tape;
   control means responsive to the sensing means for activating the drive means thereby to maintain the lateral position of the tape along the predetermined path leading to the takeup reel.

* * * * *